A. H. JONES.
PROCESS OF MAKING NUTS.
APPLICATION FILED FEB. 18, 1914.
1,176,904.
Patented Mar. 28, 1916.
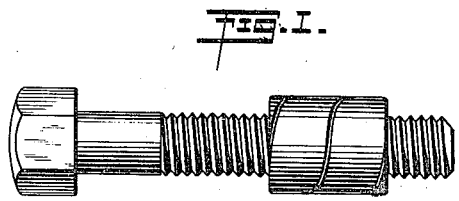
FIG. 1.
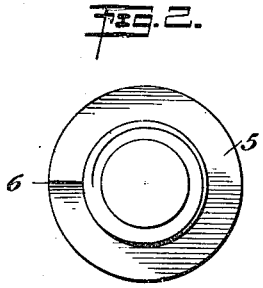
FIG. 2.
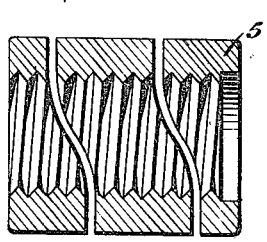
FIG. 3.
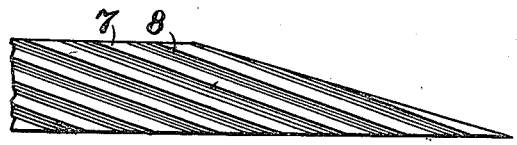
Fig. 4.
WITNESSES
INVENTOR
Allan H. Jones
BY 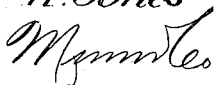
ATTORNEYS

UNITED STATES PATENT OFFICE.

ALLAN H. JONES, OF EAST ORANGE, NEW JERSEY.

PROCESS OF MAKING NUTS.

1,176,904.  Specification of Letters Patent.  Patented Mar. 28, 1916.

Application filed February 18, 1914. Serial No. 819,375.

*To all whom it may concern:*

Be it known that I, ALLAN H. JONES, a citizen of the United States, and a resident of East Orange, in the county of Essex and State of New Jersey, have invented a new and Improved Process of Making Nuts, of which the following is a full, clear, and exact description.

My invention relates to a process of making helical nuts.

An object thereof is to provide a simple, inexpensive and efficient process whereby a longitudinal toothed bar is wound into a helix with the teeth on the bar forming an interior, continuous thread. The so-formed helical member can then be severed into sections of predetermined length, thereby forming helical nuts which are resilient and self-locking.

Reference is to be had to the accompanying drawings forming a part of this specification, in which like characters indicate corresponding parts in all the views and in which:

Figure 1 is a bolt provided with a nut formed by my process; Fig. 2 is an end view of the nut; Fig. 3 is a longitudinal section therethrough; and Fig. 4 is a plan view of a portion of a toothed bar before the same is wound into a helix.

Referring to the drawings, 5 represents a nut which is formed of an elongated member 7 on which teeth 8 are formed diagonally by any suitable means. The elongated member is then wound into a helix so as to bring the diagonal teeth in alinement to form a continuous, predetermined thread within the helix formed. The so formed helix is then severed into sections of predetermined length, each section forming a nut. It may be also stated that the nut so formed is provided with a helical slit in the body thereof.

The nut so formed when wound has its interior diameter slightly less than the diameter of the bolt; and when said nut is hardened it contracts still further, thus increasing the frictional resistance between the thread of the bolt and the threads formed in the nut. This difference in diameter permits the nut, which is resilient due to its structure, to grip the bolt and lock itself thereon. The slight expansion of the nut, due to the difference of the diameters between the threads in the nut and on the bolt, produces enough friction to prevent the movement of the nut on the bolt that may be caused by vibration, which is the general cause of the unscrewing of nuts.

The slit 6, which is formed in the nut by winding the same from an elongated member into a helix, is caused to contract when said nut on the bolt comes in contact with the means which the bolt is supposed to bind. This decrease in width of the slit distorts slighly the alinement of the threads and thus increases the binding action between the thread of the bolt and that of the nut and also decreases the chances of the nut unscrewing itself from the bolt. Furthermore, the helix can be so formed as to cause the same to decrease in size when the nut has tightened on the bolt, thus increasing the binding action between the threads of the bolt and the nut.

It is understood that a nut so formed can have its exterior surface so shaped as to fit any suitable wrench, although the ordinary cylindrical surface is preferable, as the same can be handed with a Stillson wrench; or, diametrically opposite, flattened portions can be provided so that the same can be engaged by an ordinary wrench.

It will be noted that a nut formed as described will be self-expanding and contracting, which is a very important feature, affording a slight distortion in the continuity of the threads in the nut, which gives an efficient grip to the nut on the bolt.

A nut as described can be manufactured very cheaply in view of the fact that a long bar can be toothed, as stated, and then wound into a helical spiral, from which nuts of any suitable length can be cut off.

It will be noted that the direction of the thread and that of the member forming the helix are opposite to each other, that is to say, a right-handed helix will have a left-handed thread, and vice versa. The reason for this is obvious, as previously explained. This difference in direction permits the contraction of the helix when the nut is tightened on the bolt to tighten the members engaged by the bolt.

Having thus described my invention, I claim as new and desire to secure by Letters Patent:

1. The process for making nuts consisting in forming teeth on one side of an elongated member, then winding the so-toothed member into a helix with said teeth forming an interior thread.

2. The process for making nuts consisting in forming teeth on one side of an elongated member, then winding the so-toothed member into a helix with said teeth forming an interior thread, then severing the so-formed helix into sections of predetermined length.

3. The process for making nuts consisting in forming teeth on one side of an elongated member, then winding the so-toothed member into a helix with said teeth forming an interior thread, the direction of the helix formed by the elongated member being opposite to the direction of the thread.

In testimony whereof I have signed my name to this specification in the presence of two subscribing witnesses.

ALLAN H. JONES.

Witnesses:
BENEDICT JOFFE,
PHILIP D. ROLLHAUS.